United States Patent Office 3,702,770
Patented Nov. 14, 1972

3,702,770
ALUMINUM AND ALKALI TITANATE ANODIC
PROTECTIVE COATING COMPOSITION
Harold J. Michael, Columbus, Ohio, assignor to North
American Rockwell Corporation
No Drawing. Filed Nov. 27, 1970, Ser. No. 93,493
Int. Cl. C04b 33/00; B05b 7/20
U.S. Cl. 106—39 R                                       6 Claims

ABSTRACT OF THE DISCLOSURE

Compositions having essentially powdered aluminum mixed with alkali titanate from the group consisting of lithium titanate and lithium-silico-titanate are provided for application to metal parts by conventional oxy-acetylene flame spraying equipment or plasma arc spraying equipment to develop improved metal part resistance to surface corrosion attack.

SUMMARY OF THE INVENTION

Aluminum metal powder is mixed in prescribed proportions with a finely divided alkali titanate compound, such as lithium-silico-titanate (lithium titanium silicate), lithium titanate, or both, by way of example, for subsequent application to any of a number of different metal parts using conventional oxy-acetylene flame spray equipment or plasma arc equipment to thereby develop improved metal part resistance to surface corrosion. The specified compositions are suitable for application in the same manner over metal part weld areas, including application over weld areas that join metal parts previously coated with different but compatible types of fused-on ceramic-metallic protective coatings.

DETAILED DESCRIPTION

The following general formulation identifies the principal constitutents, by range and on a 100 parts by weight basis, of the ceramic-metallic protective coating compositions of this invention:

COATING COMPOSITIONS

| Constituent: | Range |
|---|---|
| Aluminum metal powder, −120 +325 mesh spherical particles | 20–80 |
| Alkali titanate compound, −120 +325 mesh frit | 20–80 |
| Total | 110.0 |

Details regarding each of the principal constituents, and particularly methods for formulating and preparing certain of such principal constituents, are provided in those portions of the detailed description which follow.

Adjustments may be made to the composition formulation within the ranges indicated to vary the degree of resistance to weathering and corrosion attack obtained for particular metal parts coated with the instant composition and also to vary the ease of application obtained with conventional spraying equipment of the oxy-acetylene type or plasma arc type as a function of the composition wetting property.

Aluminum powder constituent

The ceramic-metallic composition of this invention utilizes −120 mesh +325 mesh aluminum powder such as is commonly purchased commercially in a spray grade form, such metal powder having particles which are substantially spherical in configuration.

Alkali titanate compound constituent

One preferred alkali titanate compound constituent is lithium-silico-titanate, sometimes referred to herein as lithium titanium silicate, an essentially non-homogeneous opalescent glass having two distinct compositional phases in both the liquid condition and the solid condition. Such constituent is preferably compounded to have a 1:1:1 molecular ratio of $Li_2O$ to $SiO_2$ to $TiO_2$ and may be made in the following manner.

The Example I ingredients given below, stated on a 100 parts total weight basis, are combined by thorough dry blending, smelted at 2000° F.–2300° F., and fritted to form the preferred lithium-silico-titanate compound constituent:

EXAMPLE I.—CONSTITUENT COMPOSITION

| Component | Range | Preferred amount |
|---|---|---|
| Silica ($SiO_2$) | 20.0–80.0 | 28.2 |
| Titania ($TiO_2$) | 20.0–80.0 | 37.3 |
| Lithium carbonate ($Li_2CO_3$) | 12.4–74.0 | 34.5 |
| Total | 100.0 | 100.0 |

The resulting frit has two compositional phases in both the liquid condition and the solid condition and is graded for use to pass a No. 120 U.S. standard sieve but remain on a No. 325 U.S. standard sieve. Particles larger than 120 mesh may be further ground for use; particles of a −325 mesh size may be re-charged into subsequent constituent batches as cullet for re-firing.

From a calculated oxide content standpoint the above detailed lithium-silico-titanate compound constituent used in the instant invention has the following composition on a 100 parts by weight basis after smelting:

| Oxide | Range | Preferred amount |
|---|---|---|
| $Li_2O$ | 5–30 | 17.6 |
| $TiO_2$ | 20–80 | 47.0 |
| $SiO_2$ | 20–80 | 35.4 |
| Total | 100.0 | 100.0 |

Another alkali titanate compound constituent satisfactory for practice of this invention is lithium titanate. Such may be included in the compositions of this invention optionally or additionally with respect to lithium-silico-titanate, for example. If provided by way of addition, the compound functions to further decrease the electrical surface resistivity property of the final coating to thereby develop improved anodic protection for the resulting coated metal part. The below detailed lithium titanate constituent, however, does not in most cases alone provide optimum surface wetting during application of the composition to metal parts by flame spraying. Such lithium titanate constituent is compounded to have a preferred 1:1 molecular ratio of $TiO_2$ to $LiO_2$ and may be made from the following Example II ingredients, detailed on a 100 parts total weight basis:

EXAMPLE II—Constituent composition

| Component: | preferred amount |
|---|---|
| Lithium Carbonate ($Li_2CO_3$) | 48.1 |
| Titania ($TiO_2$) | 51.9 |
| Total | 100.0 |

The ingredients of the constituent are combined by thorough blending (either wet or dry) and fused into clinker form in an air furnace at a temperature of approximately 2000° F.±50° F. for subsequent crushing and screening. The above Example II ingredients may alternatively be melted at a temperature of approximately 2300° F.±50° F. and fritted in lieu of being fused into clinker form for the subsequent processing.

The resulting ground clinker or frit is graded to pass a No. 120 U.S. standard sieve and remain on a No. 325

U.S. standard sieve for use. As in the case of the lithium titanium silicate constituent, particles larger than 120 mesh may be further ground for use; particles of a —325 mesh size may be re-charged into subsequent lithium titanate constituent batches as cullet for refiring.

It should be noted that other alkali titanates may be used in the coating composition formulations although lithium titanate compounds are preferred inasmuch as lithium is more electropositive and provides superior anodic metal protection in comparison to other alkali metal titanates such as sodium titanate or potassium titanate or in comparison to alkali earth metal titanates such as the titanates of magnesium, calcium, strontium, or barium. Stated in another manner, lithium titanate compounds appear to particularly enhance or improve the electrical surface conductivity of the applied coating.

The following Example III, Example IV, and Example V coating composition formulations, given on a 100 parts by total weight basis, are examples of embodiments of this invention that have been utilized for satisfactorily developing improved resistance to corrosion attack for metal parts to which the composition has been applied.

EXAMPLE III—Coating composition

| Constituent: | Preferred amount |
|---|---|
| Aluminum metal powder, —120 +325 mesh spherical particles | 40 |
| Lithium-silico-titanate, —120 +325 mesh frit | 40 |
| Lithium titanate ($Li_2TiO_3$), —120 +325 mesh frit | 20 |
| Total | 100 |

EXAMPLE IV—Coating composition

| Constituent: | Preferred amount |
|---|---|
| Aluminum metal powder, —120 +325 mesh spherical particles | 50 |
| Lithium-silico-titanate, —120 +325 mesh frit | 50 |
| Total | 100 |

EXAMPLE V—Coating composition

| Constituent: | Preferred amount |
|---|---|
| Aluminum metal powder, —120 +325 mesh spherical particles | 50 |
| Lithium titanate ($Li_2TiO_3$), —120 +325 mesh frit | 50 |
| Total | 100 |

Details with respect to application of any of the above Example III through V coating compositions to metal parts by flame spraying are given below.

The desired constitutents of —120 +325 mesh screen size for a particular coating composition prior to application of the composition to a metal part of flame spraying are first carefully weighed to the proper proportions and then dry blended until a uniform color is obtained. Flame spraying, as suggested previously, is then accomplished using either conventional oxy-acetylene flame spray equipment or conventional plasma arc flame spraying equipment depending upon availability. In either case, however, it is necessary that the metal part, which may be a large milled steel structural part by way of example, should be cleaned by mechanical means in those areas which are to be coated. Cleaning may be accomplished either by abrasive blasting using a 40–80 mesh clean sand or alundum grit, by disc sanding, or by stiff wire brushing. The areas to be coated basically must be free of oxide, scale, welding flux, and other foreign material prior to application of the coating composition. Since roughened, clean metal surface is essential to good adherence, any loose particles should therefore be removed from the metal part surface as by blowing using clean, dry, compressed air.

Using conventional oxy-acetylene flame spray equipment, by way of example a Metco powder spray gun with a ceramic material feed nozzle having a No. 2 feed orifice, the compositions are applied by box or cross coating the metal part practicing the following steps. First, and prior to starting the flow of composition through the gun, pre-heat the surface to be initially sprayed by passing the gun flame over the surface at a distance of from 6″ to 8″ thereby accomplishing a degree of pre-heating. Next, composition flow is started, adopting the equipment manufacturer's control setting recommendations as to feed setting, oxygen flow, and acetylene flow, and application is accomplished by spraying the metal part surface using horizontal straight-line rather than arc-type motion with the composition material impinging upon the metal part surface at as near a 90° angle as possible. After the pre-heating has been accomplished with respect to the area to be initially coated, the remainder of the metal part is normally automatically pre-heated as the spraying work progresses. Adequate coverage of the metal part is usually obtained using one cross or box coat with a composition deposit density of from 20 to 23 grams of composition per square foot of metal part surface. Care must be taken that the speed of application is not so fast as to produce a loose, powdery-type coating. Normally non-porous coating is obtained with gun travel over the work at a velocity of not more than four feet per minute.

The non-porous composition coating as sprayed has excellent bond in adhesion as well as cohesion. The coating composition as sprayed provides excellent long time anodic protection for numerous different ferrous metals, stainless steels, and nickel-base alloys exposed to salt corrosion environments. In some cases (Example I, Example III formulations) the applied intermetallic compound coating has essentially a zero resistance to electrical current flow with as little as 40% to 50% by weight aluminum metal content. In addition, the coating has outstanding resistance to impact, bending, or deformation failure by virtue of a high degree of inherent ductility. The coating is compatible with fused-on type of cermet protective coatings, such as the coatings detailed in my co-pending Application for United States Letters Patent Serial No. 69,914, filed Sept. 4, 1970 (a continuation-in-part of Application for U.S. Letters Patent Ser. No. 833,698, filed June 16, 1969 and assigned to the assignee of this application and now abandoned), and has also been successfully applied over conventional welds that serve to join two metal parts previously coated with such fused-on type of cermet protective coatings.

I claim:
1. A protective coating composition for application to metals by flame spraying, said coating composition consisting prior to application, on a 100 parts total weight basis, of a uniform mixture of approximately:
    (a) 20 to 80 parts aluminum metal powder in finely divided sprayable particle form, and
    (b) 20 to 80 parts of alkali titanate compound in finely divided frit form,
said alkali titanate compound being selected from the group consisting of lithium titanate and lithium-silico-titanate.

2. The composition defined by claim 1 consisting of approximately 40 parts by weight of aluminum metal powder, 40 parts by weight of lithium-silico-titanate, and 20 parts by weight of lithium titanate.

3. The composition defined by claim 1 consisting of approximately 50 parts by weight of aluminum metal powder and 50 parts by weight of lithium titanate.

4. The composition defined by claim 1 consisting of approximately 50 parts by weight of aluminum metal powder and 50 parts by weight of lithium-silico-titanate.

5. The composition defined by claim 2 wherein said lithium-silico-titanate on a calculated oxide content basis consists of lithium oxide, silicon oxide, and titanium oxide in an approximately 1:1:1 molecular ratio.

6. The composition defined by claim 4 wherein said lithium-silico-titanate on a calculated oxide content basis consists of lithium oxide, silicon oxide, and titanium oxide in an approximately 1:1:1 molecular ratio.

References Cited

UNITED STATES PATENTS

| | | | |
|---|---|---|---|
| 2,904,449 | 9/1959 | Bradstreet | 117—105.2 X |
| 2,775,531 | 12/1956 | Montgomery et al. | 117—22 |
| 2,697,159 | 12/1954 | Donahey | 106—313 X |
| 2,745,769 | 5/1956 | Linnert et al. | 117—129 X |
| 3,388,001 | 6/1968 | Blum et al. | 117—105.2 X |
| 2,848,349 | 8/1958 | Rechter et al. | 117—105.2 X |
| 3,322,515 | 5/1967 | Dittrica et al. | 29—191.2 |

FOREIGN PATENTS

| | | | |
|---|---|---|---|
| 1,080,383 | 4/1960 | Germany | 219—146 |

OTHER REFERENCES

Levin, E. et al.: Phase Diagrams for Ceramists; Columbus 1964 p. 172 ($LiAO$—$SiO_2$—$TiO_2$).

JAMES E. POER, Primary Examiner

W. R. SATTERFIELD, Assistant Examiner

U.S. Cl. X.R.

29—182.5, 195; 75—94; 117—105.2; 148—26; 219—146

PO-1050
(5/69)

UNITED STATES PATENT OFFICE
CERTIFICATE OF CORRECTION

Patent No. 3,702,770         Dated November 14, 1972

Inventor(s) HAROLD J. MICHAEL

It is certified that error appears in the above-identified patent and that said Letters Patent are hereby corrected as shown below:

Column 1, line 49, change "110.0" to "100.0"

Column 3, line 56, after "part" change "bf" to "by".

Signed and sealed this 29th day of May 1973.

(SEAL)
Attest:

EDWARD M. FLETCHER, JR.  
Attesting Officer

ROBERT GOTTSCHALK  
Commissioner of Patents